United States Patent [19]

Dumbaugh, Jr.

[11] Patent Number: 4,824,808
[45] Date of Patent: Apr. 25, 1989

[54] SUBSTRATE GLASS FOR LIQUID CRYSTAL DISPLAYS

[75] Inventor: William H. Dumbaugh, Jr., Painted Post, N.Y.

[73] Assignee: Corning Glass Works, Corning, N.Y.

[21] Appl. No.: 118,266

[22] Filed: Nov. 9, 1987

[51] Int. Cl.$^4$ .................... C03C 3/091; C03C 3/093
[52] U.S. Cl. ........................................ 501/66; 501/67
[58] Field of Search ..................... 501/66, 67

[56] References Cited

U.S. PATENT DOCUMENTS

| | | | |
|---|---|---|---|
| 2,393,449 | 1/1946 | Amistead | 501/66 |
| 2,834,738 | 5/1958 | Vincent | 501/66 |
| 3,310,413 | 3/1967 | Harrington | 501/66 |
| 3,338,696 | 5/1967 | Dockerty | 65/145 |
| 3,978,362 | 8/1976 | Dumbaugh et al. | 313/221 |
| 4,302,250 | 11/1981 | Danielson | 501/70 |
| 4,394,453 | 7/1983 | Dumbaugh | 501/66 |
| 4,409,337 | 10/1983 | Dumbaugh | 501/66 |
| 4,634,683 | 1/1987 | Dumbaugh | 501/32 |
| 4,666,867 | 5/1987 | Beall et al. | 501/67 |

Primary Examiner—Mark L. Bell
Attorney, Agent, or Firm—Kees van der Sterre

[57] ABSTRACT

Glass compositions suitable for the manufacture of sheet glass for liquid crystal display (LCD) devices are disclosed, such glasses consisting essentially, in cation percent, of about 52-58% $SiO_2$, 12.5-18% $Al_2O_3$, 20-23% $B_2O_3$, 0-4% MgO, 0-6% CaO, 0-6% SrO, 1-9% BaO, 8-12% MgO+CaO+SrO+BaO, -3% ZnO, and 0-1% of fining agents. These glasses have a strain point in excess of 625° C., an average linear coefficient of thermal expansion in the range of about 20-60×10$^{-7}$/°C. over the range 25°-300° C., an internal liquidus temperature not exceeding about 1050° C., and chemical durability sufficient to exhibit a weight loss in 5% HCl at 95° C. not exceeding about 10 mg/cm$^2$ in a 24 hour period, and so offer the glass stability necessary for overflow downdraw sheet forming and the high strain point and chemical durability needed for LCD manufacture.

3 Claims, No Drawings

SUBSTRATE GLASS FOR LIQUID CRYSTAL DISPLAYS

BACKGROUND OF THE INVENTION

The present invention relates generally to glass compositions for liquid crystal display devices, and more specifically to alkaline earth boroaluminosilicate glasses exhibiting the hardness, chemical durability, and high-temperature stability required for use in the forming of glass sheet for liquid crystal display devices.

Alkaline earth boroaluminosilicate glasses constitute a very well known family of glass compositions. U.S. Pat. No. 2,393,449, for example, discloses alkaline earth boroaluminosilicate glasses which are substantially free of alkali metal oxides, and which therefore exhibit high dielectric constants and low power factors. These glasses have compositions comprising about 10-30% BaO, 5-20% $Al_2O_3$, 22-80% $B_2O_3$, and up to about 55% $SiO_2$ by weight, and are particularly suitable for use as glass dielectric layers in capacitors and other electronic devices.

Other known alkali-free silicate glasses, more recently developed, are the alkaline earth aluminosilicate glasses employed as lamp envelopes in tungsten-halogen lamps. Tungsten-halogen lamps require glasses having relatively high strain points, low coefficients of thermal expansion, and high viscosity at the liquidus, so that they may be formed utilizing conventional glass tube drawing equipment and will withstand the relatively high lamp operating temperatures required. Examples of this type of glass are reported in U.S. Pat. No. 3,978,362, which discloses glasses comprising about 58-63% $SiO_2$, 13-16% $Al_2O_3$, 14-21% CaO, 0-5% MgO, and 0-7% BaO, with the total of CaO, MgO and BaO constituting at least 19% by weight.

Additional families of aluminosilicate compositions designed specifically for use in tungsten-halogen lamps have also been reported. U.S. Pat. No. 4,302,250 discloses glass compositions comprising 64-68% $SiO_2$, 11-14% CaO, 16.5-18.5% $Al_2O_3$ and 2-6.5% total of SrO and BaO, wherein SrO may range from about 0-4% and BaO about 0-5% by weight of the composition. These glasses exhibit strain points in excess of 750° C., and offer high viscosity at the liquidus in combination with a relatively low liquidus temperature.

U.S. Pat. No. 4,394,453 discloses glasses comprising about 60 ±1.5% $SiO_2$, 17±1% $Al_2O_3$, 5±0.8% $B_2O_3$ 11.4±0.8% CaO, and 7.5 ±0.8% MgO. These glasses reportedly exhibit improved thermal stability and viscosity characteristics which are needed for glass tube manufacture by the Vello tube drawing process. U.S. Pat. No. 4,409,337 discloses glasses for tungsten-halogen lamps consisting essentially of about 56-59% $SiO_2$, 16-17% $Al_2O_3$, 4.5-5.25% $B_2O_3$, 7.5-9.25% CaO, 5.5-6.25% MgO, and 5-9% BaO. A critical feature of the latter compositions is control of the BaO content to effect a lowered liquidus temperature, with ZnO optionally being present to modify thermal expansion.

A current application of particular interest for alkaline earth aluminosilicate glasses is in the manufacture of flat glass substrates for flat panel display devices. U.S. Pat. No. 4,634,683 generally describes the glass properties required for this application, and the processing used to incorporate such glasses into flat panel displays. Glasses disclosed as suitable for this use consist essentially, in mole percent, of approximately 68-80% $SiO_2$, 18-26% $Al_2O_3$, and 2-6% total of BaO and SrO.

Related glasses for flat panel displays are described in U.S. Pat. No. 4,634,684, wherein glasses consisting essentially, in mole percent, of about 77-82% $SiO_2$, 9-12% $Al_2O_3$, and 9-12% SrO are disclosed. These glasses exhibit the high annealing points needed for processing into display devices, and also exhibit high viscosity at the liquidus temperature so that they can be formed by overflow downdraw sheet forming methods such as described in U.S. Pat. No. 3,338,696. However, they must be melted and formed at relatively high temperatures, which are beyond the proven capability of presently existing large-scale melting equipment.

As pointed out in the latter two patents, present liquid crystal display (LCD) technology involves the application of large arrays of thin film transistors directly to the surface of the glass. Such transistor arrays have been found to be essential in order to provide displays exhibiting rapid switching response to electrical signals.

To provide the required thin film transistor (TFT) array, the transistors are grown in situ on a sheet of the substrate glass which has been pretreated to provide a polysilicon layer thereon. However the development of such a layer demands a glass with a rather high strain point temperature because of the elevated processing temperatures which are customarily used. In fact, as the display technology has progressed, glasses exhibiting higher and higher strain points have been required. At the same time, however, the thermal expansion characteristics needed to insure physical compatibility between the glass and the polysilicon support layer have had to be maintained, as has the excellent chemical durability required for TFT array development and support.

The various requirements for glasses to be used for LCD display applications employing thin film transistor array technology, and which must be combined in a single glass, may be summarized as follows:

(1) the glass must be substantially free of intentionally added alkali in order to avoid the possibility that alkali from the glass substrate could migrate into the transistor matrix;

(2) the glass substrate must be sufficiently chemically durable to withstand the reagents used in the TFT matrix deposition process;

(3) the expansion mismatch between the glass substrate and the silicon present in the TFT array must be maintained or even reduced as processing temperatures for these substrates increase; and (4) the glass must be producible in high quality sheet form at low cost, and thus should not require extensive grinding and polishing to achieve the necessary surface finish.

This last requirement implies that a sheet glass manufacturing process capable of producing essentially finished glass sheet, such as an overflow downdraw sheet manufacturing process, must be used. This in turn demands a glass with a high viscosity at the liquidus; the minimum liquidus viscosity for stable long-term overflow downdraw sheet forming is presently considered to be about $3 \times 10^5$ poises.

A commercially available glass, presently used for the fabrication of liquid crystal display devices, is Corning Code 7059 glass. This glass, consisting of about 50% $SiO_2$, 15% $B_2O_3$, 10% $Al_2O_3$, and about 24% BaO by weight, is nominally alkali-free, has an expansion of about $46 \times 10^{-7}$° C., and exhibits a viscosity somewhat in excess of $10^6$ poises at the liquidus temperature. The high liquidus viscosity of this glass facilitates the production of glass sheet therefrom by overflow downdraw sheet processing. However, the relatively low strain point (approximately 590° C.) of this glass only marginally meets the demands of advanced LCD display processing technology.

To withstand present display processing a glass strain point of at least 625° C. is considered to be required, and the chemical durability of the glass should also be substantially improved. However, it is difficult to increase the strain point of alkali-free glasses of known types without undesirably raising the liquidus temperature of the glass beyond a level which is essential for the efficient and economical manufacture of glass sheet. Nevertheless, useful improvements in glass processability for such displays would require glasses exhibiting not only the higher strain point, but also an average linear coefficient of thermal expansion in the range of about $20$–$60 \times 10^{-7}$/° C., a viscosity at the glass liquidus temperature in excess of about $3 \times 10^5$ poises, and a chemical durability characterized by a weight loss in 5% (weight) aqueous HCl at 95° C. not exceeding about 10 mg/cm$^2$ of glass surface area over an interval of 24 hours.

SUMMARY OF THE INVENTION

In accordance with the present invention, a limited region of composition in the alkaline earth boroaluminosilicate composition system has been identified which yields glasses simultaneously meeting all of the abovestated requirements for advanced liquid crystal display substrate processing. Generally defined, glasses provided in accordance with the invention and meeting these requirements consist essentially, in cation percent, of about 52–58% $SiO_2$, 12.5–18% $Al_2O_3$, 20–23% $B_2O_3$MgO, 0–6% CaO, 0–6% SrO, and 8–12% total of MgO+CaO+SrO +BaO, with 0–3% of ZnO optionally being present as a further modifying constituent.

Glasses within the scope of the invention may optionally comprise other known constituents, such as fining agents, colorants, or other additives, used in minor proportions to modify melting characteristics, appearance, and/or other glass properties. However, such additions should be restricted in quantity in order to maintain the aforementioned composition limits, since glasses outside those limits have been found not to exhibit the required properties.

DETAILED DESCRIPTION

While the effects of varying individual glass components in the alkaline earth boroaluminosilicate glasses of the invention are complex and interrelated, some general effects of some composition variations have been observed. Thus, for example, if the silica content of the composition is too high, the glasses tend to be difficult to melt. On the other hand, if insufficient silica is present it is difficult to maintain a high strain point in the glass.

Alumina also has an important role in maintaining an adequate strain point in the glass, but if present in excess quantity, alumina is found to excessively raises the liquidus temperature of the glass. $B_2O_3$ must be kept within the specified ranges because if present in excess, it unduly lowers the acid durability of the glass, as well as the strain point thereof. MgO is helpful in small quantities to control the liquidus temperature of the glass, but again reduces acid durability in excessive quantities.

CaO and SrO are useful in modifying the viscosity-temperature function of the glass, helping to achieve a lower liquidus temperature and/or higher glass viscosity at the liquidus, but excessive quantities can exert a counter effect and can undesirably raise the liquidus temperature of the glass.

BaO is a key ingredient for controlling the glass liquidus and for maintaining a satisfactory viscosity at the liquidus, but too much of this constituent unduly softens the glass, and also adds significantly to the glass batch cost. ZnO in small quantities can aid in adjusting properties, but more than a few percent will again unduly lower the strain temperature of the glass.

As previously noted, the manufacture of active TFT arrays on glass substrates in accordance with current liquid crystal display fabrication technology requires that a deposit of polycrystalline silicon first be applied to the glass substrate. Where sophisticated LCD devices are required, polycrystalline silicon is used, requiring higher processing temperatures for the glass substrate. It is generally accepted that the strain point of the glass represents approximately the maximum temperature through which the glass can be processed during these fabrication steps without damage to the glass or the applied coatings.

It is also important that the glass be essentially free of alkali metal oxides, since alkalis have the effect of softening the glass and, more importantly, also tend to migrate into the polysilicon coating during subsequent display processing. As previously noted, borosilicate and aluminosilicate glasses essentially free of alkali metal oxides and exhibiting high softening points are known in the art. In the case of the known aluminosilicate compositions, however, the glasses generally have higher liquidus temperatures than desired for stable downdraw sheet forming. Thus these known aluminosilicate glasses cannot economically be used to make finished glass sheet for displays.

Borosilicate glasses, on the other hand, have lower liquidus temperatures and better viscosity-temperature characteristics than the aluminosilicate glasses. However, they do not provide the high strain point and acid durability needed for this application.

Table I below reports the composition of two known alkali-free glasses in the borosilicate and aluminosilicate systems. The compositions in Table I are reported in cation percent, with the corresponding weight percent values being shown in parentheses. Also shown in Table I for each of the two compositions are chemical and physical properties for each glass, including the softening, annealing, and strain point temperatures thereof, the expansion and density of each glass, and chemical durability as evidenced by weight loss in 5% HCl. The internal liquidus temperatures of the glasses and the viscosities thereof at the respective liquidus temperatures are also reported.

As reported in the Table, the borosilicate glass, so designated because the cationic ratio of boron exceeds that of aluminum in the glass, is Corning Code 7059 glass. This glass exhibits high viscosity at the liquidus, but also a relatively low strain point and relatively low chemical durability as evidenced by high weight loss in contact with aqueous HCl. The aluminosilicate glass in Table I, Corning Code 1724 glass, exhibits a much higher strain point than the borosilicate glass, and also much lower susceptibility to acid attack. However it also demonstrates a viscosity at the liquidus temperature which is lower than would be desired.

TABLE I

|  | Code 7059 | Code 1724 |
| --- | --- | --- |
| $SiO_2$ | 51.0 (50) | 54.5 (55.8) |
| $B_2O_3$ | 26.0 (15) | 8.0 (4.9) |
| $Al_2O_3$ | 12.9 (10) | 18.5 (16.7) |
| MgO | — | 8.0 (5.8) |
| CaO | — | 8.0 (7.9) |
| BaO | 10.1 (24) | 3.0 (8.3) |
| Softening Point, °C. | 844° | 926° |
| Annealing Point, °C. | 639° | 726° |
| Strain Point, °C. | 593° | 674° |
| Density, g/cc | 2.76 | 2.64 |
| Average Thermal Expansion, /°C. ($\times 10^7$) | 46 | 44 |
| Liquidus Temp., °C. (Internal - 24 hrs.) | 898° | 1100° |
| Liquidus Visc., poises | $>20 \times 10^5$ | $1 \times 10^5$ |
| Weight loss, mg/cm² (5% HCl - 95° C., 24 hrs.) | 9.8 | 0.25 |

A principal problem solved in accordance with the invention is that of identifying a region of glass composition which exhibits higher strain point and durability than the prior art glasses, yet exhibits neither an excessively high liquidus temperature nor a viscosity at the liquidus so low that the glass cannot be economically formed into high quality glass sheet. The latter requirement is critical since, for overflow downdraw sheet forming processing of the kind required for economical glass sheet production, a viscosity of at least $2 \times 10^5$ and more preferably $3 \times 10^5$ at the liquidus temperature of the glass is a practical requirement.

Table II below sets forth examples of glass compositions within the scope of the invention and simultaneously meeting all of the requirements as to properties. Included in Table II for each of the glasses reported are the concentrations of the glass constituents, in cation percent, the physical properties of each glass including the softening point (Soft.Pt.), annealing point (Anneal.Pt.), and strain point (Strain.Pt.) temperatures thereof, the thermal expansion (Therm.Exp.) and density of the glasses, and the liquidus temperatures and viscosities at the liquidus temperatures for the glasses where determined on individual glass samples. The thermal expansion values are again reported as average values over the range 25°–300° C. multiplied by $10^7$, and the liquidus temperatures are 24 hr. internal liquidus temperatures. Liquidus viscosities are reported in poises multiplied by $10^{-5}$.

Table II also includes weight loss (Wt.Loss) figures after HCl immersion, reflecting the chemical durability of the glasses. The latter values are again weight losses in milligrams/square centimeter from the surface of glass samples following immersion in 5% HCl at 95° C. for 24 hours.

TABLE II

|  | 1 | 2 | 3 | 4 | 5 |
| --- | --- | --- | --- | --- | --- |
| $SiO_2$ | 53 | 53 | 57 | 53 | 53 |
| $Al_2O_3$ | 17 | 17 | 13 | 15 | 15 |
| $B_2O_3$ | 20 | 20 | 20 | 22 | 22 |
| MgO | 2 | 2 | 2 | 2 | 2 |
| CaO | 4 | 4 | — | — | — |
| SrO | 2 | — | — | — | 4 |
| BaO | 2 | 4 | 8 | 8 | 4 |
| Soft.Pt., °C. | 923 | 918 | — | — | 906 |
| Anneal.Pt., °C. | 696 | 693 | 672 | 686 | 679 |
| Strain.Pt.,°C. | 650 | 645 | 628 | 636 | 630 |
| Therm.Exp.,/°C.($\times 10^7$) | 36.6 | 37.5 | 41.2 | 40.8 | 39.9 |
| Density, g/cm³ | 2.48 | 2.52 | 2.64 | 2.64 | 2.58 |
| Liquidus,°C. | 1032 | 1016 | 1014 | 1013 | 1001 |
| Visc. @ Liq., p. ($\times 10^{-5}$) | 14 | 22 | — | — | 22 |
| Wt. Loss, mg/cm² | 3.8 | 2.9 | 0.8 | 4.8 | 4.2 |

TABLE II-continued

|  | 6 | 7 | 8 | 9 |
| --- | --- | --- | --- | --- |
| $SiO_2$ | 53 | 53 | 53 | 53 |
| $Al_2O_3$ | 15 | 15 | 15 | 17 |
| $B_2O_3$ | 22 | 22 | 20 | 20 |
| MgO | — | 4 | 2 | 2 |
| CaO | — | — | 2 | — |
| SrO | 2 | — | 2 | 4 |
| BaO | 8 | 6 | 6 | 4 |
| Soft.Pt. °C. | — | — | — | 918 |
| Anneal.Pt., °C. | 691 | 679 | 676 | 690 |
| Strain Pt., °C. | 641 | 631 | 632 | 640 |
| Therm.Exp.,/°C.($\times 10^7$) | 43.5 | 37.9 | 42.9 | 39.7 |
| Density, g/cm³ | 2.67 | 2.56 | 2.64 | 2.59 |
| Liquidus, °C. | 1011 | 983 | 1013 | 1042 |
| Visc. @ Liq., p. ($\times 10^{-5}$) | — | — | — | 13 |
| Wt. Loss, mg/cm² | 6.8 | 5.0 | 2.4 | 3.4 |

Table IIA below sets forth corresponding weight percent values for the compositions reported in cation percent in Table II above.

TABLE IIA

| | (Weight Percent) | | | | | | | | |
| --- | --- | --- | --- | --- | --- | --- | --- | --- | --- |
|  | 1 | 2 | 3 | 4 | 5 | 6 | 7 | 8 | 9 |
| $SiO_2$ | 57.21 | 56.21 | 56.22 | 52.88 | 54.68 | 51.79 | 54.94 | 53.38 | 54.38 |
| $Al_2O_3$ | 15.57 | 15.30 | 10.88 | 12.70 | 13.13 | 12.44 | 13.19 | 12.82 | 14.80 |
| $B_2O_3$ | 12.51 | 12.29 | 11.43 | 12.72 | 13.15 | 12.45 | 13.21 | 11.67 | 11.89 |
| MgO | 1.44 | 1.41 | 1.31 | 1.33 | 1.38 | 0 | 2.78 | 1.35 | 1.38 |
| CaO | 4.03 | 3.96 | 0 | 0 | 0 | 0 | 0 | 1.88 | 0 |
| SrO | 3.73 | 0 | 0 | 0 | 7.12 | 3.37 | 0 | 3.47 | 7.08 |
| BaO | 5.51 | 10.83 | 20.14 | 20.37 | 10.53 | 19.95 | 15.87 | 15.42 | 10.47 |

As previously noted, composition is critical in achieving simultaneously all of the physical and chemical properties objectives of glasses provided according to the invention. Table III sets forth examples of glass compositions inside and outside of the specified range of compositions meeting these objectives. Table III includes the compositions of various glasses, again reported in cation percent, together with the annealing and strain points of the glasses, the thermal expansion and densities thereof, and the liquidus and chemical durability of the reported glasses.

TABLE III

|  | 1 | 2 | 3 | 4 |
| --- | --- | --- | --- | --- |
| $SiO_2$ | 51 | 51 | 53 | 53 |
| $Al_2O_3$ | 12.9 | 12.9 | 15 | 15 |
| $B_2O_3$ | 26 | 26 | 22 | 22 |
| MgO | — | 2 | 2 | — |
| CaO | — | — | — | — |
| SrO | — | — | — | — |
| BaO | 10.1 | 8.1 | 8 | 10 |
| ZnO | — | — | — | — |
| Annealing Point, °C. | 651 | 647 | 686 | 692 |
| Strain Point, °C. | 606 | 600 | 636 | 642 |
| Therm. Exp.,/°C. ($\times 10^7$) | 46.3 | 43.3 | 40.8 | 45.5 |
| Density, g/cm³ | 2.76 | 2.66 | 2.64 | 2.70 |
| Internal Liquidus, °C. | 932 | 907 | 1013 | 1080 |
| Wt. Loss, mg/cm² (5% HCl) | 13 | 16 | 4.8 | 3.6 |

|  | 5 | 6 | 7 | 8 |
| --- | --- | --- | --- | --- |
| $SiO_2$ | 55 | 55 | 53 | 51 |
| $Al_2O_3$ | 10.9 | 12.9 | 15 | 12.9 |
| $B_2O_3$ | 24 | 22 | 22 | 22 |
| MgO | 2 | 3 | — | 4 |
| CaO | 4 | 3 | 4 | 4 |
| SrO | — | — | — | — |
| BaO | 4.1 | 4.1 | 4 | 6 |
| ZnO | — | — | 2 | — |
| Annealing Point, °C. | 674 | 673 | 679 | 659 |
| Strain Point, °C. | 631 | 627 | 633 | 617 |
| Therm. Exp./°C. ($\times 10^7$) | 38.4 | 36.9 | 36.4 | 44.3 |

TABLE III-continued

| | | | | |
|---|---|---|---|---|
| Density, g/cm$^3$ | 2.50 | 2.50 | 2.54 | 2.66 |
| Liquidus, °C. | 1034 | 1037 | 1043 | 1022 |
| Wt. Loss, mg/cm$^2$ (5% HCl) | 31 | 5 | 5.7 | 12 |

As is evident from an examination of Table III, Examples 1, 2 and 8 reported in the table exhibit strain points which are insufficiently high to meet the demands of current liquid crystal display device fabrication technology, and these glasses together with Example 5 do not demonstrate the required chemical durability. Examples 3, 4, 6 and 7 exhibit adequate chemical durability, but Example 6 is only marginal as to glass strain point while Example 4 exhibits unacceptably high liquidus temperatures.

Preferred glass compositions for use in the invention will consist, in cation percent, of about 53–57% SiO$_2$, 15–17% Al$_2$O$_3$, 20–22% B$_2$O$_3$, 1–6% BaO, 1–2% MgO, 0–4% CaO, 0–4% SrO, and 10–12% total of MgO+CaO+SrO+BaO. Within this range of compositions, glasses exhibiting strain points above 630° C., thermal expansion coefficients between 38–43×10$^{-7}$/°C., liquidus temperatures below 1020° C., and viscosities at the liquidus in excess of 10$^6$ poises can readily be provided which additionally exhibit excellent chemical durability.

I claim:

1. A glass composition consisting essentially, in cation percent, of about 52–58% SiO$_2$, 12.5–18% Al$_2$O$_3$, 20–23% B$_2$O$_3$, 0–4% MgO, 0–6% CaO, 0–6% SrO, 1–9% BaO, 8–12% MgO+CaO+SrO+BaO, 0–3% ZnO, and 0–1% of fining agents, said composition providing a glass having a strain point in excess of 625° C., an average linear coefficient of thermal expansion in the range of about 20–60×10$^{-7}$/°C. over the temperature range 25°–300° C., an internal liquidus temperature not exceeding about 1050° C., and chemical durability sufficient to exhibit a weight loss in 5% HCl at 95° C. not exceeding about 10 mg/cm$^2$ in a 24 hour period.

2. A glass composition consisting essentially, in cation percent, of about 53–57% SiO$_2$, 15–17% Al$_2$O$_3$, 20–22% B$_2$O$_3$, 1–6% BaO, 1–2% MgO, 0–4% CaO, 0–4% SrO, and 10–12% total of MgO+BaO+CaO+BaO, said composition providing a glass exhibiting a strain point in excess of 630° C., a thermal expansion coefficient in the range of about 38–43×10$^{-7}$/°C., a liquidus temperature below 1042° C., and a viscosity at the liquidus in excess of 1.3×10$^5$ poises.

3. A glass composition in accordance with claim 2 which contains 3–4% CaO, 1–3% BaO, and 1–3% SrO.

* * * * *

UNITED STATES PATENT AND TRADEMARK OFFICE
CERTIFICATE OF CORRECTION

PATENT NO. : 4,824,808

DATED : 4/25/89

INVENTOR(S) : William H. Dumbaugh, Jr.

It is certified that error appears in the above-identified patent and that said Letters Patent is hereby corrected as shown below:

On the title page, item [57],
lines 6 and 7 of the Abstract, change "-3% ZnO" to
--0-3% ZnO--.

Column 1, line 50, place a comma after "$B_2O_3$".

Column 3, line 32, change "abovestated" to --above-stated--.

Column 3, line 37, after "$B_2O_3$" insert --, 1-9% BaO, 0-4%--.

Signed and Sealed this

Twenty-eighth Day of November 1989

Attest:

JEFFREY M. SAMUELS

*Attesting Officer*     *Acting Commissioner of Patents and Trademarks*